US008825691B2

(12) United States Patent
Knebel et al.

(10) Patent No.: US 8,825,691 B2
(45) Date of Patent: Sep. 2, 2014

(54) OPEN SEARCH ASSIST

(75) Inventors: Wolfgang Knebel, Hamburg (DE); Marco Boerries, Los Altos Hills, CA (US)

(73) Assignee: Yahoo! Inc., Sunnyvale, CA (US)

( * ) Notice: Subject to any disclaimer, the term of this patent is extended or adjusted under 35 U.S.C. 154(b) by 518 days.

(21) Appl. No.: 12/477,671

(22) Filed: Jun. 3, 2009

(65) Prior Publication Data
US 2010/0312773 A1 Dec. 9, 2010

(51) Int. Cl.
*G06F 17/30* (2006.01)
*G06F 15/16* (2006.01)

(52) U.S. Cl.
CPC .............................. *G06F 17/30991* (2013.01)
USPC ........................................ 707/759; 709/203

(58) Field of Classification Search
None
See application file for complete search history.

(56) References Cited

U.S. PATENT DOCUMENTS

| | | | |
|---|---|---|---|
| 8,190,627 B2 * | 5/2012 | Platt et al. ..................... 707/767 |
| 2007/0067305 A1 | 3/2007 | Ives | |
| 2007/0136256 A1 * | 6/2007 | Kapur et al. ..................... 707/3 |
| 2007/0143262 A1 | 6/2007 | Kasperski | |
| 2007/0244872 A1 * | 10/2007 | Hancock ........................... 707/3 |
| 2008/0016034 A1 | 1/2008 | Guha et al. ........................ 707/3 |
| 2008/0109401 A1 | 5/2008 | Gaurav et al. | |
| 2008/0133449 A1 | 6/2008 | Richardson et al. | |
| 2008/0168052 A1 | 7/2008 | Ott et al. ........................... 707/5 |
| 2008/0270228 A1 | 10/2008 | Dasdan | |
| 2008/0270389 A1 * | 10/2008 | Jones et al. ........................ 707/5 |
| 2008/0275864 A1 | 11/2008 | Kim et al. | |
| 2009/0024465 A1 | 1/2009 | Burckart et al. | |
| 2010/0306191 A1 * | 12/2010 | Lebeau et al. ................. 707/723 |

FOREIGN PATENT DOCUMENTS

| | | |
|---|---|---|
| CN | 101268463 | 9/2008 |
| JP | 2009-104607 | 5/2009 |
| WO | 2007/024645 | 3/2007 |
| WO | 2007/042840 | 4/2007 |

OTHER PUBLICATIONS

Search Report and Written Opinion dated Dec. 31, 2010 for International Application No. PCT/US2010/035268.
CN patent application No. 101283357 English abstract.
CN patent application No. 201080023245.6, Office Action mailed Apr. 2, 2013.
KR patent application No. 10-2012-7000054, Office Action mailed Apr. 25, 2013.
JP patent application No. 2012-513965, Office Action mailed May 1, 2013.
TW patent application No. 099117226, Office Action mailed Jun. 10, 2013.
KR patent application No. 10-2012-7000054, Notice of Preliminary Rejection mailed Nov. 29, 2013.

* cited by examiner

*Primary Examiner* — Tarek Chbouki
(74) *Attorney, Agent, or Firm* — Weaver Austin Villeneuve & Sampson LLP

(57) ABSTRACT

Embodiments provide improved search assist functionality. The search assist functionality assists with a search by providing more than simply suggestions for searches as the user is typing, and allows a user more direct and rapid access to the desired information. This is especially useful in mobile computing devices such as handsets. It also allows for greater realization of associated advertising revenue.

21 Claims, 5 Drawing Sheets

301

302

303

306

305

304

OPEN SEARCH ASSIST

BACKGROUND OF THE INVENTION

This invention relates generally to search engines, queries, and systems.

Search engines and the related search systems provide relevant and useful information to users. They also generate revenue from advertisements provided with or as a part of the search results.

Mobile handheld devices present unique challenges in terms of limited screen space for displaying results and advertising, and greater latency than home or office internet connections, whether wired or wireless. Mobile handheld devices also present unique challenges in interfacing with users that may be in transit and distracted.

SUMMARY OF THE INVENTION

The disclosed embodiments provide an improved search assist function that minimizes the amount of user interaction to arrive at a given end result. That is to say, intermediate steps are minimized or eliminated. This is particularly advantageous in mobile devices with limited screen sizes and data transfer rates, and multi-tasking users.

Embodiments provide the ability to monetize or prioritize from or for a particular provider as a search assist choice. For example, embodiments allow for a revenue ranking for recommendations of potential query results/objects by or with gross or net revenue associated with a provider or particular object.

In one embodiment, clustered search results are opened via a backend application programming interface ("API") to third party services and application developers such that query types or result sets that relate directly to a certain service provider are clustered, delivered, displayed or used to increase relative ranking and display orientation, creating an improved user experience.

One aspect relates to a system for providing search results. The system comprises a group of search provider servers configured to receive search queries and provide search results relevant to the queries, and an application programming interface for usage at a third party server. The application programming interface at the third party server configures the third party server to: receive a partial search request from a client device to be serviced by the group of search provider servers; access a search assist function of the group of search provider servers to obtain a plurality of potential complete search queries matching the partial search request; provide the plurality of potential complete search queries to the client device; receive indication of a selection of one of the plurality of potential complete search queries at the client device; provide the indication or notice of the indication to the group of search provider servers; and receive a direct search result from the group of search provider servers. The group of search provider servers is configured to provide a search assist object in response to the indication provided by the application programming interface that when selected at the client links directly to an end source of information without first presenting a search results page.

Another aspect relates to a computer system for providing search results to users, in which the computer system is configured to: (a) receive a partial search query from a client; (b) transform the partial search query into a group of potential complete search queries based upon the partial search query; (c) gather advertisements relevant to the partial search query; (d) categorize the partial search query, and gather advertisements relevant to the partial search query by a category determined by the categorization, and (f) return to the client the group of potential complete search queries and advertisements, wherein each potential complete search query comprises a link to an end result associated with the query, thereby allowing a user to go directly to an end result from a potential complete search query without first selecting from a search results page.

A further understanding of the nature and advantages of the present invention may be realized by reference to the remaining portions of the specification and the drawings.

DETAILED DESCRIPTION OF SPECIFIC EMBODIMENTS

Figure 1:
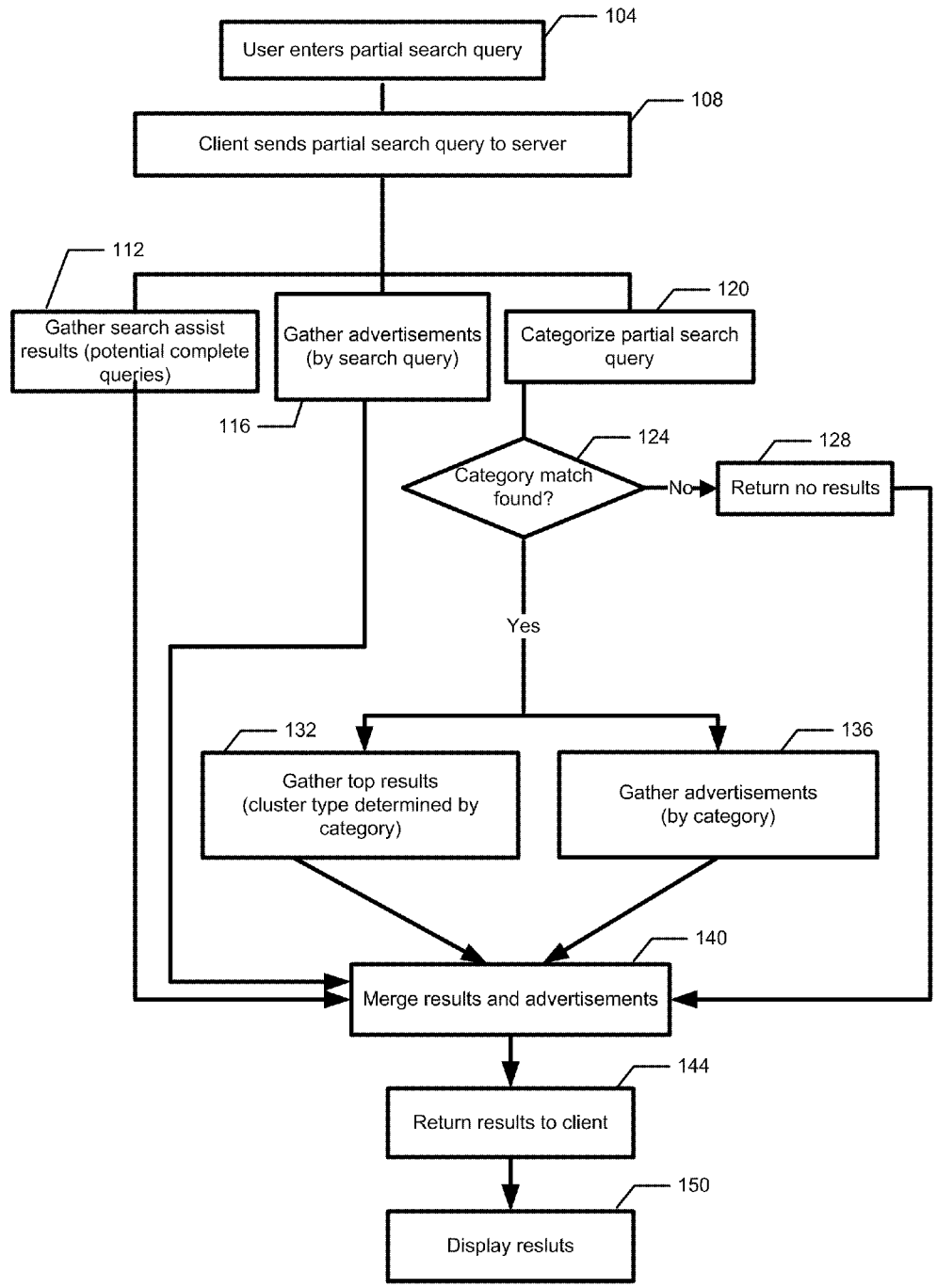
FIG. 1 is a flowchart of a search process according to an embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Prior types of available search assist functionality detect a string as it is typed and suggest some popular strings that the user may be typing or interested in. The user may then continue typing in their search or select one of the strings being suggested. Once the search term is selected and entered it is submitted to the search system (e.g. Yahoo!) and the results, typically in the form of hyperlinks with related text, are returned to the user, either directly or via a $3^{rd}$ party provider. The user then selects from among the hyperlinks, which directs them to the URL and associated destination where the information resides.

This is in contrast with embodiments of the present invention, in which the search results page is bypassed. When the results page and step of showing the same is bypassed, the relevant information may be more directly retrieved and viewed, which is especially valuable for the user of a mobile device, e.g. a handset.

In one embodiment, the search assist provides an object that comprises the display information and a link that transports the user directly to the source of the information (e.g. URL for the information) without first having to select from a results page. In certain embodiments, an object comprising scripts that may include java and/or HTML scripting is provided as part of the search assist. When the user selects this, the scripts will be executed.

Certain embodiments provide for search assist functionality that can be employed by any 3$^{rd}$ party provider to integrate search functionality of a search provider as well as search assist into the 3$^{rd}$ party provider service and provide the service to a mobile user. A widget or other interface can access a search engine of a search.

In certain embodiments, an advertisement related to the query and based on the partially completed query may be shown to the user before the user has even completed his query. In one embodiment this is automatically done, i.e. without any user input, whereas in another embodiment this is achieved through the embedded scripts in the object, and the advertisement will not appear until the user selects the provided (search assist) object.

FIG. 1 is a flow chart illustrating an exemplary process for fulfilling a search request. In step 104, a user enters a partial search query. Before the search query is completed, the client device the user is utilizing sends the partial search query to the search provider system. The search provider system comprises a special purpose computer system for fulfilling search requests, as will be described with regard to FIGS. 4A and 4B. The partial search query may be sent directly to the search provider system, or may first be routed to another intermediary that accesses the search provider system. Steps 112, 116, and 120 are preferably done in parallel. In step 112, classic search assist results are gathered. This involves searching for full strings that match the partial strings of the partial search query.

In step 116, advertisements pertinent to the partial search query are gathered. In step 120, the partial search query is categorized. For example, the system is able to parse and process a string and detect if the query string relates to a category type (e.g. travel, celebrity, movie, . . . ) and/or contained location information (e.g. searching for "hotel New York").

If a category match is found, as determined in step 124, then the top results for the particular category will be gathered in step 132. This involves determining the cluster type (of a larger set of search results) by category. In step 136 advertisements are also gathered, by category. Steps 132 and 136 are preferably done in parallel. If a category match was not found in step 128, or alternatively after step 132 and 136 have been performed (if a category match was found) the results and advertisements are merged in step 140. The results are then returned to the client in step 144 and displayed by the client in step 150. The order upon which the results are ranked when the results are merged, returned to the client, and presented may take advertising revenue for each search assist string (complete query based on a partial query). Embodiments provide the ability to monetize or prioritize from or for a particular provider as a search assist choice. For example, embodiments allow for a revenue ranking for recommendations of potential query results/objects by or with gross or net revenue associated with a provider or particular object.

For more information on fulfillment of such search queries, please refer to the following applications, each of which is incorporated by reference in the entirety: Ser. No. 11/486,818 entitled "Search Equalizer" and published as US-2008-0016034-A1; Ser. No. 11/651,102 entitled "Clustered Search Processing" and published as US-2008-0168052; and Ser. No. 11/833,173 entitled "Enabling Clustered Search Processing via Text Messaging."

Figure 2:
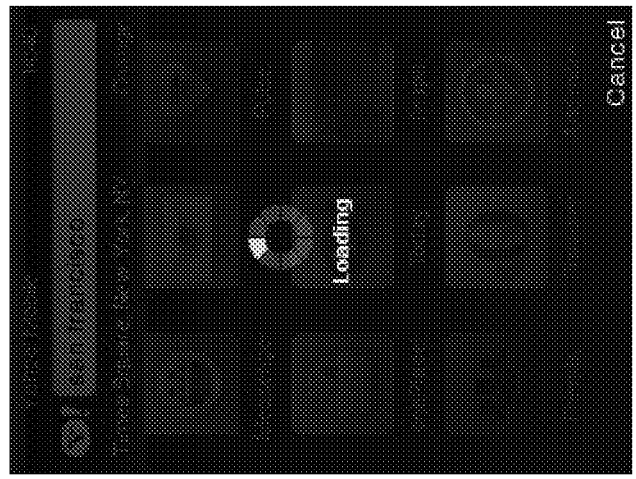
FIGS. 2 and 3 illustrate graphical user interfaces for composing search queries and displaying the results of the queries according to embodiments of the invention.
Figure 2:
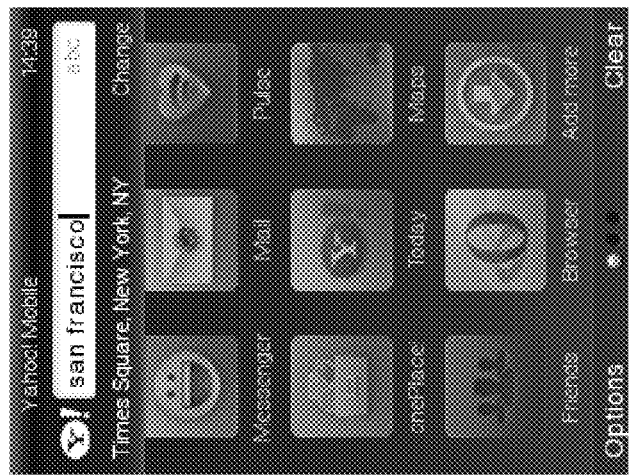
Figure 2:
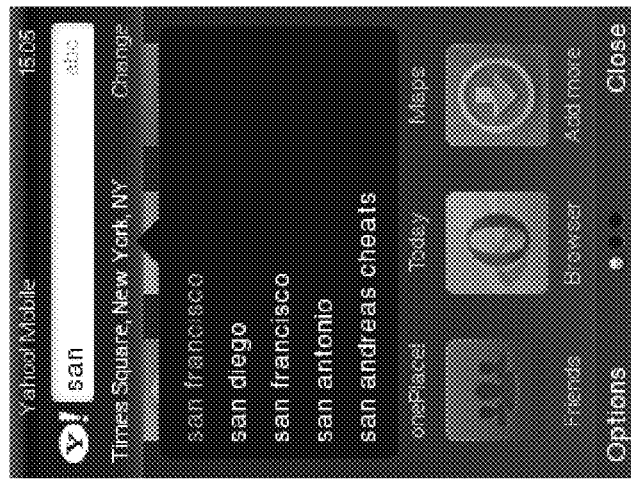
Figure 3:
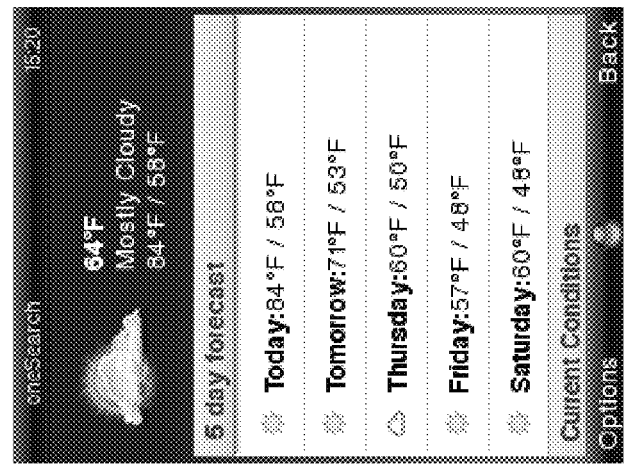
Figure 3:
Figure 3:

FIGS. 2 and 3 illustrate user interface screens of a (handheld) client device. Screens 301-306 illustrate a progression of screens and steps in time, as seen at the user interface. Screen 301 illustrates a search query being entered. The partial search query of "san" is shown as being entered. A search assist function of the search provider (e.g. Yahoo!) provides a group of options to assist the user in formulating the query. Screen 301 illustrates a classic type of assist where strings are suggested that are similar to the partial string. The string may in some embodiments contain an embedded link or be associated with a link or be part of an object comprising the string and a link. For example, the options of "san francisco," "san diego," "san antonio," and "san andreas cheats" are shown. The user may then select one of the search assist provided options for performing the search, as seen in screen 302, where the user has selected "san francisco" from the group of search assist options. In screen 303 the user interface displays a loading screen while the search results are fetched and loaded to the client, from the search provider or an intermediary.

In screen 304, a search result page is shown with some search results. The user may then select from amongst the results. Screen 305 illustrates a loading indication, asking the user to please wait a moment (and a slight darkening of the screen) while the selected "weather" result is opened. In screen 306, the San Francisco "weather" result detail page is displayed to the user.

In a preferred embodiment, the search process is abbreviated, and only some of the screens 301-306 and associated steps are needed to provide the end information, in this example, the weather result detail page 306, to the user. In accordance with the embodiment and process described in the flow chart of FIG. 1, a search query page such as that of screen 302 is bypassed. The choices offered by the improved search assist function are not simply strings that may be selected as the basis of a query. As discussed above, the choices instead are objects comprising a link to an end result, and an advertisement or link to an advertisement, that when selected will return the end result. Thus, in the exemplary screens in FIGS. 2 and 3, screen 304 is also bypassed as the user need not select from among the choices of the search results page. Likewise, the additional time required for the second loading, depicted in screen 305 is eliminated. Only one loading is required, as represented by the loading seen in screen 303.

In summary, by clicking (or otherwise selecting) an offering provided by the search assist, the final information that would be provided by otherwise clicking upon the search results is directly loaded and provided. The input and time required by and associated with the steps depicted in screens 302, 304, and 305 is eliminated in a preferred embodiment.

In a mobile device, this is tremendously advantageous. As mentioned above, a mobile device user may be doing any number of things simultaneously. Thus, the fewer steps and delays before arriving at a result, the better. For example, a distracted user boarding or exiting an airplane with various items in his hands will find the improved search technique useful. As another example, despite warnings and other recommendations to the contrary, a mobile device user may perform a search while driving, and the lower input requirements and faster results presentation will lessen the risk associated with usage of the mobile device.

Figure 4A:
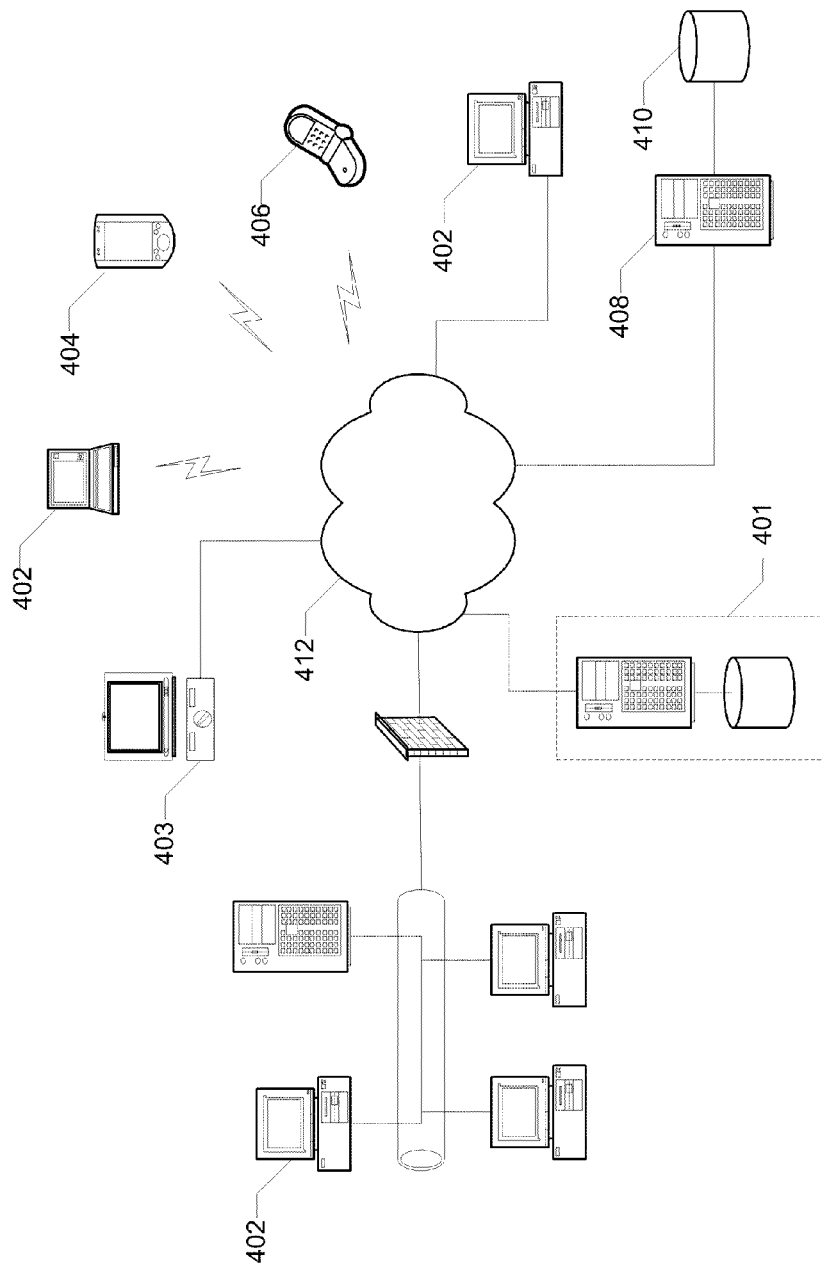
FIG. 4A is a simplified diagram of a computing environment in which embodiments of the invention may be implemented.

Such a search system may be implemented as part of a larger network, for example, as illustrated in the diagram of FIG. 4A. Implementations are contemplated in which a population of users interacts with a diverse network environment, accesses email and uses search services, via any type of computer (e.g., desktop, laptop, tablet, etc.) 402, media computing platforms 403 (e.g., cable and satellite set top boxes and digital video recorders), mobile computing devices (e.g., PDAs) 404, cell phones 406, or any other type of computing or communication platform. The population of users might include, for example, users of online email and search services such as those provided by Yahoo! Inc. (represented by computing device and associated data store 401).

Regardless of the nature of the search service provider, searches may be processed in accordance with an embodiment of the invention in some centralized manner. This is represented in FIG. 4A by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

Figure 4B:
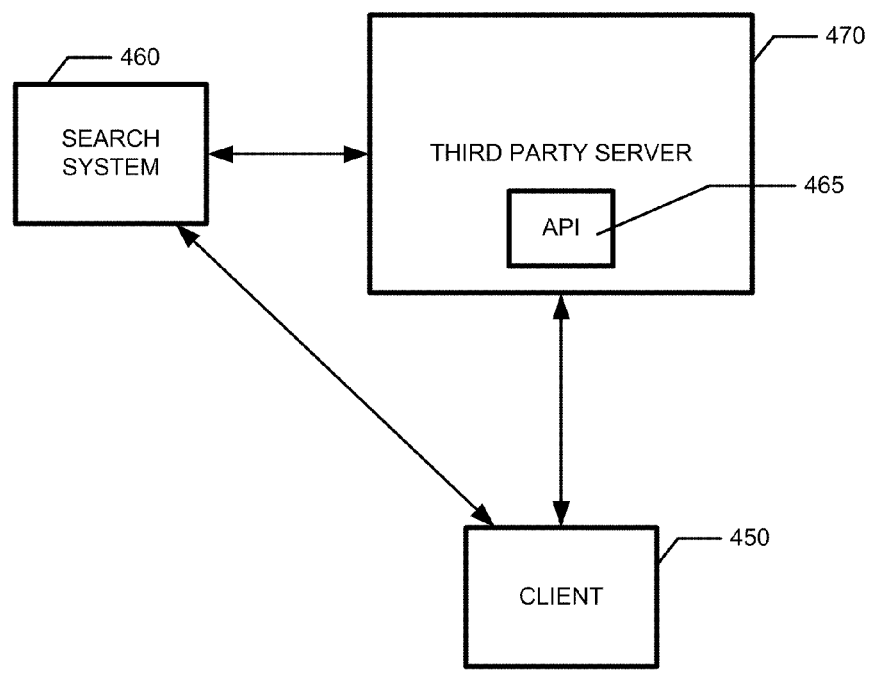
FIG. 4B is another simplified diagram of a computing environment in which embodiments of the invention may be implemented.

In certain embodiments, the search assist functionality may be deployed by sites other than the search provider. These sites are referred to as $3^{rd}$ parties and their servers are referred to as third party servers. Such an embodiment is depicted in FIG. 4B. A search provider (e.g. Yahoo!) provides an API 465 for use by the $3^{rd}$ party servers 470. The API enables the third party servers to access the search system 460 (e.g. server 408 and data store 410 of FIG. 4A) to query and provide the search assist functionality and objects and provide the same to client 450 (e.g. computer 402, media computing platforms 403, mobile computing devices 404, cell phones 406 etc. of FIG. 4A). For example, a search widget may be incorporated into the $3^{rd}$ party system and may receive the search query, and through API 465 would access the search system 460 to provide the search assist and fulfill the query. The final results and other coordinating steps may pass from the client to/from the search system 460 via the $3^{rd}$ party server 470 and API 465 or alternatively may be transmitted directly between search system 460 and client 450.

In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

Embodiments provide the ability to monetize or prioritize from or for a particular provider as a search assist choice. For example, embodiments allow for a revenue ranking for recommendations of potential query results/objects by or with gross or net revenue associated with a provider or particular object.

The above described embodiments have several advantages. They allow for quicker and more effective placement of advertising. The advertisement provided as the result of a partial query may also be of a rich media type. Therefore, a partial search query can trigger a multimedia (e.g. audio/video) advertisement.

They also eliminate loading steps and the latency associated with the steps. For example, by bypassing the search results page, only one loading step is required to present the desired result. Again, this is especially useful in mobile devices, where data transfer are often lesser than land based internet access, whether wired or wireless according to 802.11 standards.

The embodiments are also advantageous in that they require less manipulation and interaction with the device in order to arrive at the desired result, as described with regards to FIGS. 1, 2 and 3. Again, this is particularly advantageous in handheld devices often used on the go and when performing other tasks simultaneously.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system comprising:
   at least one processor and memory, the memory storing therein computer-readable instructions that, when executed by the at least one processor, cause the processor to:
   obtain a partial search query;
   obtain a plurality of potential complete search queries matching the partial search query;
   categorize the partial search query into a category based, at least in part, upon content of the partial search query;
   gather one or more advertisements relevant to the partial search query by the category determined by the categorization;
   provide the advertisements with the plurality of potential complete search queries, wherein the plurality of potential complete search queries are user-selectable;
   receive an indication of a selection by a user of one of the plurality of potential complete search queries; and
   in response to the indication, automatically provide content from a search result via a mobile device without first presenting search results associated with the selected one of the plurality of potential complete search queries, thereby allowing a user to automatically obtain content in response to the selection of a potential complete search query without first selecting from search results associated with the selected potential complete search query.

2. The system of claim 1, wherein the search result comprises a web page including the content, and wherein the web page including the content is automatically presented in response to a selection of one of the potential complete search queries.

3. The system of claim 1, wherein the computer-readable instructions, when executed by the at least one processor, cause the processor to performing steps, further comprising:
   access a search assist function of a group of search provider servers to obtain the plurality of potential complete search queries matching the partial search query.

4. A computer implemented method, comprising:
   receiving a partial search query;
   obtaining a group of potential complete search queries based upon the partial search query;
   categorize the partial search query into a category based, at least in part, upon content of the partial search query;
   gather one or more advertisements relevant to the partial search query by the category determined by the categorization;

providing the potential complete search queries or portion thereof and the advertisements, wherein the potential complete search queries are user-selectable;

receiving an indication of a selection by a user of one of the potential complete search queries; and in response to the indication of the selection of one of the potential complete search queries, automatically providing content from a search result via a mobile device without first presenting search results associated with the selected potential complete search query, thereby allowing a user to automatically obtain content in response to the selection of a potential complete search query without first selecting from search results associated with the selected potential complete search query.

5. The method of claim 4, further comprising:

prioritizing the potential complete search queries according to revenue associated with a provider of a good or service associated with the search result.

6. The computer implemented method of claim 4, wherein the search result comprises a web page including the content, and wherein the web page including the content is automatically presented in response to a selection of one of the potential complete search queries.

7. A computer system for providing search results to users, the computer system comprising at least one processor and memory, the at least one processor or the memory being configured to:

receive a partial search query;

obtain a group of potential complete search queries based upon the partial search query;

gather one or more advertisements relevant to the partial search query and return the group of potential complete search queries and advertisements via a mobile device, wherein the potential complete search queries are user-selectable, and wherein each potential complete search query includes or is associated with a link a document associated with the potential complete search query, thereby allowing a user to automatically obtain content from a document accessed via the link associated with one of the potential complete search queries in response to the selection by the user of the potential complete search query without first being presented or selecting from search results associated with the selected potential complete search query.

8. The computer system of claim 7, wherein the computer system is further configured to return a rich media advertisement comprising audio and/or video.

9. The computer system of claim 7, wherein the computer system is further configured to return a rich media advertisement that is rendered upon presentation of the group of potential complete search queries before one of the potential complete search queries is chosen.

10. The computer system of claim 7, wherein the computer system is further configured to return a rich media advertisement comprising audio and/or video that is rendered after selection of one of the group of potential complete search queries.

11. The computer system of claim 7, wherein the computer system is further configured to prioritize the potential complete search queries according to revenue associated with a provider of a good or service associated with the document.

12. The computer system of claim 7, wherein categorizing the partial search query into a category comprises determining whether the partial search query contains location information.

13. The computer system of claim 7, wherein the document comprises a web page including the content, and wherein the web page including the content is automatically presented in response to a selection of one of the potential complete search queries.

14. A computer implemented method for fulfilling search queries, the method comprising:

receiving a partial search query;

obtaining a group of potential complete search queries based upon the partial search query;

obtaining one or more advertisements relevant to the partial search query and providing at least a portion of the group of potential complete search queries and the advertisements via a mobile device wherein the at least a portion of potential complete search queries are user-selectable and wherein each potential complete search query includes or is associated with a link to a document associated with the potential complete search query, thereby allowing a user to automatically obtain content from a document accessed via the link associated with one of the potential complete search queries in response to the selection by the user of the potential complete search query without first being presented or selecting from a search results associated with the selected potential complete search query.

15. The computer implemented method of claim 14, further comprising prioritizing potential complete search queries based upon revenue garnered by presenting each of the individual potential complete search queries.

16. The computer implemented method of claim 14, further comprising displaying the group of potential complete search queries and advertisements.

17. The computer implemented method of claim 14, further comprising providing an application programming interface to a third party, the application programming interface enabling the third party to coordinate search assist operations with a search provider.

18. The computer implemented method of claim 17, wherein the partial search query is routed through the third party.

19. The computer implemented method of claim 17, the group of potential complete search queries and advertisements is returned through the third party.

20. The computer implemented method of claim 14, wherein obtaining the group of potential complete search queries and gathering advertisements are performed in parallel.

21. The computer implemented method of claim 14, wherein the document comprises a web page including the content, and wherein the web page including the content is automatically presented in response to a selection of one of the potential complete search queries.

* * * * *